United States Patent
Ai et al.

(10) Patent No.: US 8,945,503 B2
(45) Date of Patent: Feb. 3, 2015

(54) METHODS FOR MAKING DOPED AND UNDOPED COPPER CHALCOPYRITE NANOPARTICLES AND THIN FILMS THEREOF

(75) Inventors: Xin Ai, San Jose, CA (US); Abdulaziz Bagabas, Riyadh (SA); Mohammed Bahattab, Riyadh (SA); John D. Bass, Union City, CA (US); Robert D. Miller, San Jose, CA (US); John Campbell Scott, Los Gatos, CA (US); Qing Song, San Jose, CA (US)

(73) Assignees: International Business Machines Corporation, Armonk, NY (US); King Abdulaziz City for Science and Technology, Riyadh (SA)

( * ) Notice: Subject to any disclaimer, the term of this patent is extended or adjusted under 35 U.S.C. 154(b) by 427 days.

(21) Appl. No.: 13/214,499

(22) Filed: Aug. 22, 2011

(65) Prior Publication Data

US 2013/0052353 A1    Feb. 28, 2013

(51) Int. Cl.
| | | |
|---|---|---|
| *B05D 7/24* | (2006.01) | |
| *B05D 3/02* | (2006.01) | |
| *C01G 49/12* | (2006.01) | |
| *C01G 49/00* | (2006.01) | |

(Continued)

(52) U.S. Cl.
CPC .. *B05D 3/02* (2013.01); *B05D 7/24* (2013.01); *C01G 49/12* (2013.01); *C01G 49/009* (2013.01); *H01F 1/0009* (2013.01); *H01F 10/007* (2013.01); *B82Y 40/00* (2013.01); *B82Y 30/00* (2013.01); *C01P 2002/54* (2013.01); *C01P 2002/72* (2013.01); *C01P 2002/82* (2013.01); *C01P 2004/03* (2013.01); *C01P 2004/04* (2013.01); *C01P 2004/32* (2013.01); *C01P 2004/64* (2013.01); *C01P 2006/60* (2013.01)
USPC .......................... 423/511; 427/511; 252/62.55

(58) Field of Classification Search
USPC .......................................................... 423/511
See application file for complete search history.

(56) References Cited

U.S. PATENT DOCUMENTS

| | | |
|---|---|---|
| 7,803,423 B2 | 9/2010 | O'Brien et al. |
| 2009/0139574 A1* | 6/2009 | Pickett et al. ................. 136/265 |

(Continued)

OTHER PUBLICATIONS

Single Crystal of CuFeS2 Nanowires Synthesized Through Solventothermal Process. M.X. Wang et al. Materials Chemistry and Physics 115 (2009) 147-150.*

(Continued)

*Primary Examiner* — Melvin C Mayes
*Assistant Examiner* — Colette Nguyen
(74) *Attorney, Agent, or Firm* — Schmeiser, Olsen & Watts

(57) ABSTRACT

A method of forming $CuFeS_2$ chalcopyrite nanoparticles. The method includes, in the presence of one or more ligands, reacting an iron-containing compound, a copper-containing compound and a sulfur-containing compound to form $CuFeS_2$ chalcopyrite nanoparticles; and wherein at least one of the ligands forms a coordination complex with copper, and at least one of the ligands forms a coordination complex with iron. Also a method of forming metal-doped $CuFeS_2$ chalcopyrite nanoparticles such as Zn-doped $CuFeS_2$ chalcopyrite nanoparticles. Also, a $CuFeS_2$ chalcopyrite nanoparticle layer on a substrate. Also, a composition of matter including Zn-doped $CuFeS_2$ chalcopyrite nanoparticles. Also, a Zn-doped $CuFeS_2$ chalcopyrite nanoparticle layer on a substrate.

27 Claims, 12 Drawing Sheets

(51) Int. Cl.
- *H01F 1/00* (2006.01)
- *H01F 10/00* (2006.01)
- *B82Y 40/00* (2011.01)
- *B82Y 30/00* (2011.01)

(56) References Cited

U.S. PATENT DOCUMENTS

2012/0055554 A1* 3/2012 Radu et al. .............. 136/264
2012/0175585 A1* 7/2012 Banin et al. .............. 257/12

OTHER PUBLICATIONS

Single Crystal of CuFeS2 Nanowires S ynthesized Through Soventothermal Process. M.X. Wang et al. Material Chemistry and Physics 115 (2009) 147-150.*

Chen et al., Single-Source Approach to Cubic FeS2 Cyrstallites and Their Optical and Electrochemical Properties, Inorganic Chemistry Article 2005, vol. 44, No. 4, 2005, pp. 951-954.

Barkat et al., Growth and characterization of CuFeS2 thin films, [online] www.ScienceDirect.com, Journal of Crystal Growth, 297 (2006), pp. 426-431.

Wang et al., Shape-controlled synthesis of semiconducting CuFeS2 nanocrystals, Solid State Sciences, 12 (2010), pp. 387-390, journal homepage: [online] www.elsevier.com/locate/ssscie.

Wang et al., Single crystal of CuFeS2 nanowires sysnthesized through solventothermal process, Materials Chemistry and Physics, 115 (2009), pp. 147-150, journal homepage: [online] www.elsevier.com/locate/matchemphys.

Hu et al., A hydrothermal reaction to synthesize CuFeS2 nanorods, Inorganic Chemistry Communications 2 (1999), pp. 569-571, [online] www.elsevier.nl/locate/inoche.

Pradhan, et al., Mechanosynthesis of nanocrystalline CuFeS2 chalcopyrite, Physica E 33 (2006), pp. 144-146, [online] www.elsevier.com/locate/physe.

Silvester et al., Hydrothermal preparation and characterization of optically transparent colloidal chalcopyrite (CuFeS2), Langmuir, 1991, 7 (1), pp. 19-22, [online] http://pubs.acs.org [retrieved on Jan. 21, 2009].

Teranishi et al., Optical Properties of a Magnetic Semiconductor: Chalcopyrite CuFeS2, I. Absorption Spectra of CuFeS2 and Fe-Doped CuAlS2 and CuGaS2, Journal of the Physical Society of Japan, vol. 36, No. 6, Jun. 1974, pp. 1618-1624.

Disale et al., A convenient synthesis of nanocrystalline chalcopyrite, CuFeS2 using single-source precursors, Applied Organometallic Chemistry, 2009, 23, pp. 492-497, [online] www.interscience.com] DOI 10.1002/aoc.1553, [retrieved on Jul. 14, 2009].

* cited by examiner

TEM of example 3

US 8,945,503 B2

METHODS FOR MAKING DOPED AND UNDOPED COPPER CHALCOPYRITE NANOPARTICLES AND THIN FILMS THEREOF

FIELD OF THE INVENTION

The present invention relates to the synthesis of nanoparticles; more specifically, it relates to methods for making doped and undoped copper chalcopyrite nanoparticles and thin films thereof.

BACKGROUND

Prior art preparations of copper-iron chalcopyrite nanoparticles suffer from one or more of disadvantages including high impurity levels, complex processing, the use of toxic precursors and ill-defined particle shapes and wide size distributions. Accordingly, there exists a need in the art to mitigate the deficiencies and limitations described hereinabove.

SUMMARY

A first aspect of the present invention is a method, comprising: in the presence of one or more ligands, reacting an iron-containing compound, a copper-containing compound and a sulfur-containing compound to form $CuFeS_2$ chalcopyrite nanoparticles; and wherein at least one of the ligands forms a coordination complex with copper, and at least one of the ligands forms a coordination complex with iron.

A second aspect of the present invention is a method, comprising: suspending $CuFeS_2$ chalcopyrite nanoparticles in a non-polar organic solvent to form a $CuFeS_2$ chalcopyrite nanoparticle suspension; applying the $CuFeS_2$ chalcopyrite nanoparticle suspension to a substrate to form a layer of $CuFeS_2$ chalcopyrite nanoparticles on the substrate; and annealing the layer of $CuFeS_2$ chalcopyrite nanoparticles to form a $CuFeS_2$ chalcopyrite nanoparticle layer on the substrate.

A third aspect of the present invention is a composition of matter, comprising: zinc-doped $CuFeS_2$ chalcopyrite nanoparticles.

A fourth aspect of the present invention is method, comprising: suspending the zinc-doped $CuFeS_2$ chalcopyrite nanoparticles of the third aspect in a non-polar organic solvent to form a zinc-doped $CuFeS_2$ chalcopyrite nanoparticle suspension; applying the zinc-doped $CuFeS_2$ chalcopyrite nanoparticle suspension to a substrate to form a layer of zinc-doped $CuFeS_2$ chalcopyrite nanoparticles on the substrate; and annealing the layer of zinc-doped $CuFeS_2$ chalcopyrite nanoparticles to form a zinc-doped $CuFeS_2$ chalcopyrite nanoparticle layer on the substrate.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

DETAILED DESCRIPTION

Copper iron disulfide ($CuFeS_2$) is one of the unique ternary compound semiconductors in the I-III-$VI_2$ family. The crystal structure of $CuFeS_2$ is a tetragonal chalcopyrite structure in which the Cu and Fe cations are tetrahedrally coordinated with sulfur anions. $CuFeS_2$ is comprised of earth abundant and low toxic elements and has interesting optical and electronic properties, such as its optical bandgap (0.3~0.6 eV), a relatively high absorption coefficient ($<10^4$ cm$^{-1}$) and reasonable mobility ($\mu_p$=10~35 cm$^2$/V-sec), leading to potential applications in photovoltaics and nonlinear optical devices. Furthermore, $CuFeS_2$ is also a unique magnetic semiconductor and an antiferromagnetic material with a high Neel temperature (>823 K), suggesting its application in spintronics devices.

In a preferred implementation of the present invention, $CuFeS_2$ chalcopyrite nanoparticles and metal (e.g., zinc) doped $CuFeS_2$ chalcopyrite nanoparticles are prepared by a solution phase synthesis in the presence of an organic amine. In addition, the present invention prepares $CuFeS_2$ nanoparticle thin films by spin-coating or dip-coating a colloidal solution (also known as a colloidal suspension) of $CuFeS_2$ nanoparticles followed by a low temperature anneal (e.g., less than about 400° C.) in an inert (e.g., non-reactive with $CuFeS_2$) atmosphere.

Figure 1:
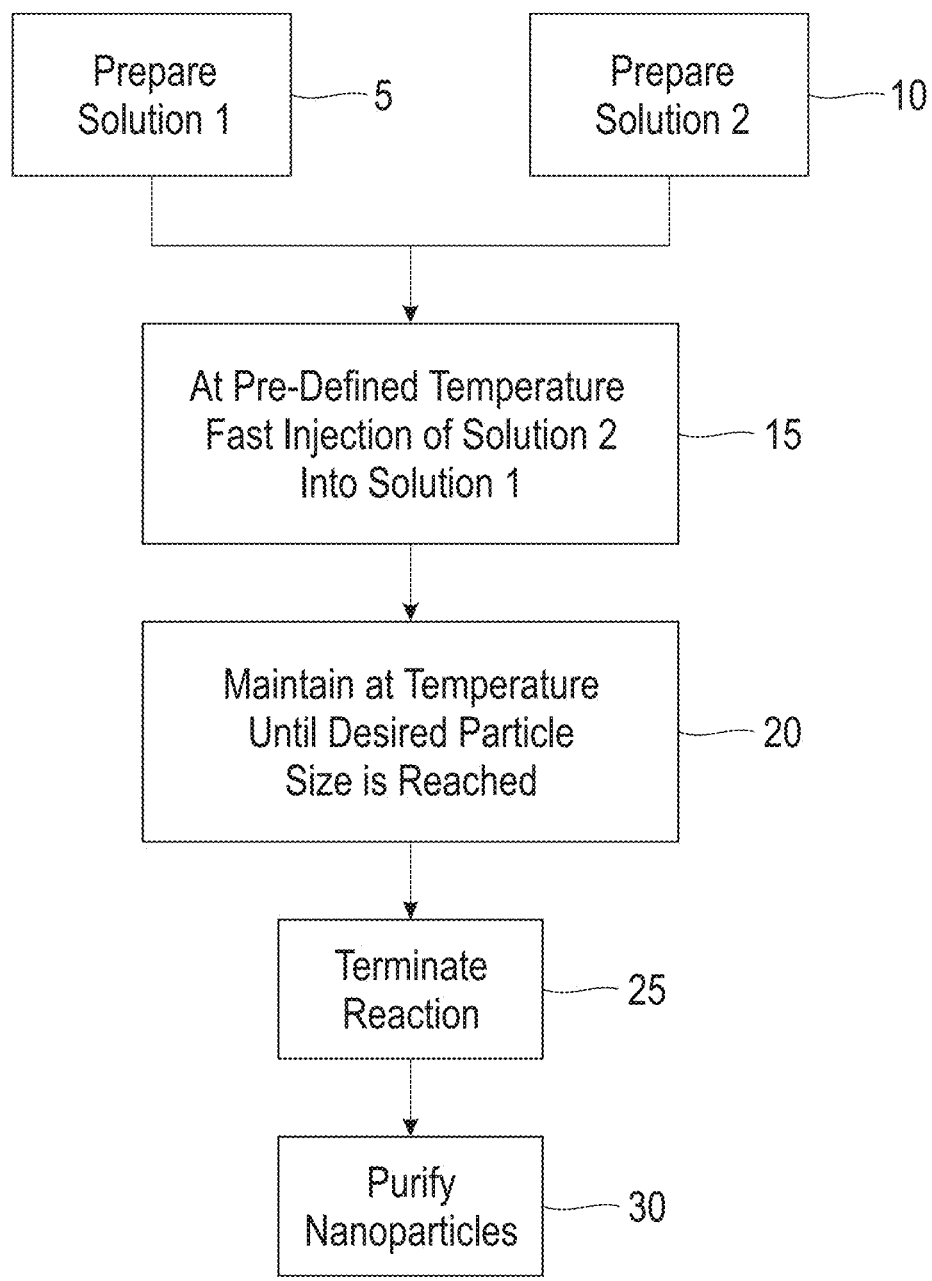
FIG. 1 is a flowchart of an exemplary method of making $CuFeS_2$ chalcopyrite nanoparticles.

FIG. 1 is a flowchart of an exemplary method of making $CuFeS_2$ chalcopyrite nanoparticles. In step 5, a first solution is prepared. In one example, the first solution is made by dissolving copper (II) acetylacetonate and iron (III) acetylacetonate in one or more alkyl amines, and the solution is degassed and dried under vacuum. Alkyl amines are examples of ligands that will form coordination complexes with copper and iron. In one example, the first solution is made by dissolving cuprous (I) chloride and iron (III) acetylacetonate in one or more alkyl amines heated to a first temperature. In one example, the first solution is made by dissolving copper (II) acetylacetonate, and iron (III) acetylacetonate and zinc acetylacetonate in one or more alkyl amines when Zn (p-type) doped $CuFeS_2$ chalcopyrite nanoparticles are desired. In one example, the first temperature is between about 180° C. and about 260° C. In one example, the one or more alkyl amines of the first solution are selected from the group consisting of primary (R—NH$_2$) saturated straight chain amines having 8 to 18 carbon atoms, primary saturated branched chain amines having 8 to 18 carbon atoms, primary unsaturated straight chain amines having 8 to 18 carbon atoms and primary unsaturated branched chain amines having 8 to 18 carbon atoms. In one example, the one or more alkyl amines of the first solution are selected from the group consisting of oleylamine, octadecylamine, hexadecylamine, tetradecylamine, dodecylamine, decylamine and octylamine.

In step 10, a second solution is prepared. In one example, the second solution is made by dissolving $S_8$ in one or more dry alkyl amines. Sulfur dissolved in a solvent is a sulfur-containing compound. In one example, the alkyl amines are at room temperature (e.g., between about 20° C. and about 25° C.). In one example, the one or more alkyl amines of the second solution are selected from the group consisting of primary (R—NH$_2$) saturated straight chain amines having 8 to 18 carbon atoms, primary saturated branched chain amines having 8 to 18 carbon atoms, primary unsaturated straight chain amines having 8 to 18 carbon atoms and primary unsaturated branched chain amines having 8 to 18 carbon atoms. In one example, the one or more alkyl amines of the second solution are selected from the group consisting of oleylamine, octadecylamine, hexadecylamine, tetradecylamine, dodecylamine, decylamine and octylamine. The one or more alkyl amines of the first solution may be the same or different from the one or more amines of the second solution. In some syntheses, a diluent which is a non-coordination organic solvent, is added to the second solution. A non-coordination organic solvent is defined as a solvent that is not a ligand for Cu or Fe (i.e., will not form a coordination complex with Cu or Fe). The non-coordination organic solvent should also not form a coordination complex with any metal dopant (e.g., Zn). In one example, the diluent is a long chain alkene of at least 12 carbon atoms with sixteen to twenty carbon atoms preferred. An example alkene is octadecene.

In step 15, the first solution is heated to a second (nucleation) temperature and then the second solution is quickly injected into the first solution. The nucleation temperature is the temperature at which Fe ions, Cu ions and S ions react to form CuFeS$_2$ chalcopyrite nanoparticles. In one example, the second temperature is at least about 180° C. In one example, the second temperature is between about 180° C. and about 250° C. The use of primary amines for the ligand has been found to be highly conducive to the formation of CuFeS$_2$ chalcopyrite nanoparticles and Zn-doped CuFeS$_2$ chalcopyrite nanoparticles. A nucleation temperature of at least about 180° C. has been found to be highly conducive to the formation of CuFeS$_2$ chalcopyrite nanoparticles and Zn-doped CuFeS$_2$ chalcopyrite nanoparticles.

In step 20, the resultant solution is maintained at the second temperature for a fixed amount of time or until the desired average particle size is obtained. In one example, the fixed time is between about 30 minutes and about 180 minutes. In one example, the average particle size is between about 5 nm to about 20 nm in diameter.

In step 25, the reaction is terminated by cooling to a third temperature and then adding a non-polar organic solvent. In one example, the third temperature is between about 50° C. and about 90° C. In one example, the non-polar organic solvent comprises one or more solvents selected from the group consisting of toluene, hexane, octane, chloroform, tetrachloroethylene, xylene, benzene and 1,2-dichlorobenzene.

In step 30, the resultant nanoparticles are purified by first addition of an anhydrous alcohol (e.g., methanol or ethanol) to precipitate nanoparticles followed by re-dispersing the nanoparticles in a non-polar organic solvent. In one example, the non-polar organic solvent comprises one or more solvents selected from the group consisting of toluene, hexane, octane, chloroform, tetrachloroethylene, xylene, benzene and 1,2-dichlorobenzene.

In an exemplary purification procedure, to a certain amount of the solution from step 25, anhydrous methanol or anhydrous ethanol is added until the solution becomes cloudy. Then the solution is subject to centrifugation at 7500 rpm for 10 minutes. The supernatant is discarded and the collected nanoparticles are re-dispersed in anhydrous toluene. The procedure is repeated, if necessary, for two to five or more times. The final product of cleaned CuFeS$_2$ nanoparticles is easily re-dispersed in various non-polar organic solvents such as toluene, hexane, octane, chloroform, tetrachloroethylene, xylene, benzene and 1,2-dichlorobenzene.

The preparation method described supra with respect to FIG. 1 should be considered exemplary and solutions having different combinations of iron-containing compounds, copper-containing compounds and zinc-containing compounds and heated to different temperatures may be used. In the examples that follow, iron-containing compounds include iron (III) acetylacetonate, ferric chloride, ferric bromide and ferric iodide; copper-containing compounds include copper (II) acetylacetonate, cuprous chloride, cuprous bromide and cuprous iodide; and zinc-containing compounds include zinc (II) acetylacetonate.

In one example, one or more iron-containing compounds and one or more copper-containing compounds are dissolved in a first solution and a sulfur-containing compound is dissolved in a second solution. One or both of the first and second solutions contains one or more primary alkyl amines (each solution may contain the same or different combinations of primary alkyl amines). One or both of the first and second solutions is heated to the nucleation temperature. (Alternatively, the two solutions may be added to yet another solution that has been pre-heated.) One or both of the first and second solutions may contain the same or different combinations of non-coordination organic solvents as a diluent. The use of a diluent is optional. Using zinc as an example of a metal-dopant, when zinc-doped CuFeS$_2$ chalcopyrite nanoparticles are desired, a zinc-containing compound may be included in the first or second solution or in a third solution. When a third solution is used, the third solution may or may not include one or more primary alkyl amines. When a third solution is used, the third solution may or may not include a non-coordination organic solvent as a diluent. Again, the use of a diluent is optional.

In one example, one or more iron-containing compounds are dissolved in a first solution, one or more copper-containing compounds are dissolved in a second solution and a sulfur-containing compound is dissolved in a third solution. One or more of the first, second and third solutions contains one or more primary alkyl amines (each solution may contain the same or different combinations of primary alkyl amines). One or more of the first, second and third solutions is heated to the nucleation temperature, and the solutions are mixed together. (Alternatively, the three solutions may be added to yet another solution that has been pre-heated.) One or more of the first, second and third solutions may contain the same or different combinations of non-coordination organic solvents as a diluent. The use of a diluent is optional. Using zinc as an example of a metal-dopant, when zinc-doped CuFeS$_2$ chalcopyrite nanoparticles are desired, a zinc-containing compound may be added to the first, second or third solution or to a fourth solution. When a fourth solution is used, the fourth solution may or may not include one or more primary alky amines. When a fourth solution is used, the fourth solution may or may not include a non-coordination organic solvent as a diluent. Again, the use of a diluent is optional.

PREPARATION EXAMPLES

All CuFeS$_2$ chalcopyrite nanoparticle syntheses were carried out using standard air-free Schlenk line techniques. All chemicals were purchased from commercial manufactures or vendors and were used as received, unless otherwise stated. The copper compounds used were copper (II) acetylacetonate and cuprous chloride; and the iron compounds used were iron (III) acetylacetonate and iron chloride (but the invention is not limited to these copper-containing and iron-containing compounds). The alkyl amines used were oleylamine and dodecylamine (but the invention is not limited to these amines).

A Varian Cary 5000 UV-Vis-NIR spectrophotometer was used for all absorption measurements in the wavelength range from 300 nm to 2100 nm. For all absorption measurements, a weighed amount of $CuFeS_2$ nanoparticles was dispersed in degassed anhydrous tetrachloroethylene (TCE). A Bruker D8 Discover with GADDS X-ray diffractometer operated at 40 kV and 40 mA using a Cu $K_\alpha$ irradiation ($\lambda$=1.5408 Å) was used for crystal structure characterization. X-ray diffraction (XRD) samples were prepared by drop-casting a nanoparticle solution on a silicon wafer until a relatively thick film was obtained. A JEOL-2010F Field Emission Transmission Electron Microscope operated at 200 kV was used for the analysis of size and shape of as-synthesized $CuFeS_2$ or Zn-doped $CuFeS_2$ nanoparticles. Samples for Transmission Electron Microscopy (TEM) imaging and analysis were prepared by drop-casting a dilute $CuFeS_2$ nanoparticle solution on a carbon-coated copper or nickel grid. Chemical compositions for all samples were analyzed by a standard Inductively Coupled Plasma Atomic Emission Spectroscopy (ICP-OES) method, and Rutherford backscattering spectroscopy (RBS) was used for chemical composition of chalcopyrite thin films.
Preparation of 1M (Molar) Sulfur-Oleylamine (S-OLMA) Stock Solution 100 milliliter (mL) of oleylamine was charged into a 250 mL air-free reaction flask and then the oleylamine was degassed by alternating between dynamic vacuum and argon environments. To further remove any trace amount of water, the oleylamine was dried at 120° C. under dynamic vacuum for one hour. After the oleylamine was cooled down to room temperature, $S_8$ equivalent to 100 millimole (mmol) of $S_1$ was added and completely dissolved in it at room temperature. Unless otherwise stated, this 1M S-OLMA stock solution is used for all syntheses.

Example 1

Synthesis of Chalcopyrite $CuFeS_2$ Nanoparticles from Copper (II) Acetylacetonate and Iron (III) Acetylacetonate in Oleylamine In an exemplary synthesis, a solution of copper (II) acetylacetonate and 1 mmol of iron (III) acetylacetonate was prepared in a three-necked reaction flask with 20 mL of oleylamine. The solution was degassed and then dried at 120° C. under dynamic vacuum for one hour. In an argon atmosphere, the solution was heated to 200° C. At this moment, 2 mL of 1M S-OLMA stock solution was rapidly (e.g., 3 tenths of a second or less) injected into the solution. After the injection, the reaction was kept at 200° C. for one hour. Then the reaction was terminated by removing the heating element, and further cooled down by air flow. When the temperature reached 60° C., 20 mL of anhydrous toluene was added. The as-synthesized $CuFeS_2$ nanoparticles were purified by the above-mentioned purification procedure.

Figure 2A:
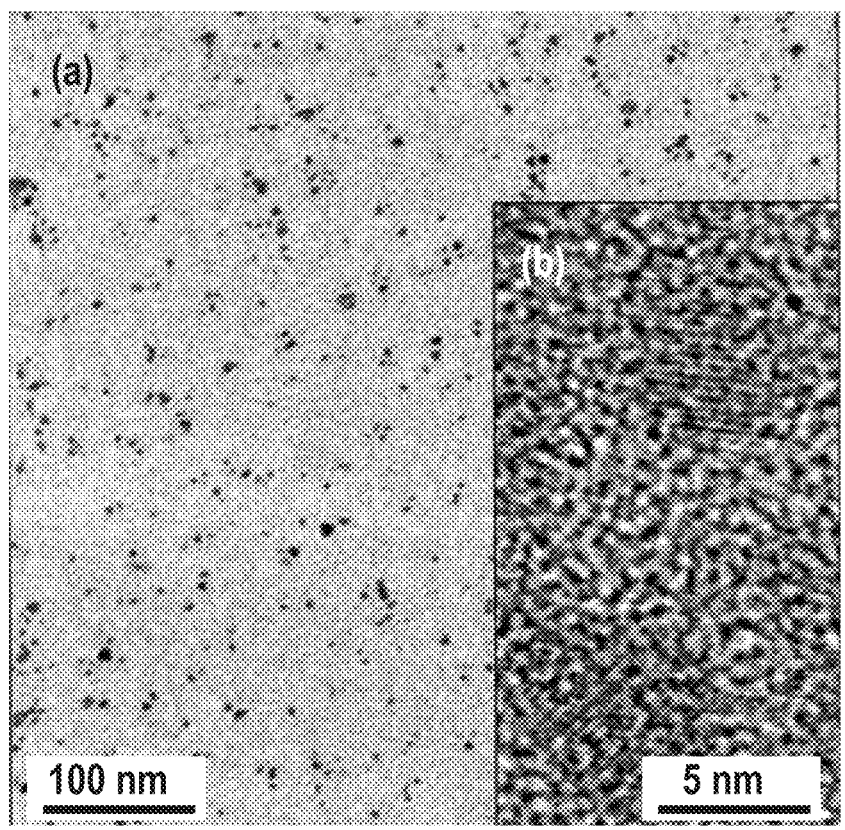
FIG. 2A(a) is a TEM image, FIG. 2A(b) is an HRTEM image.
Figure 2B:
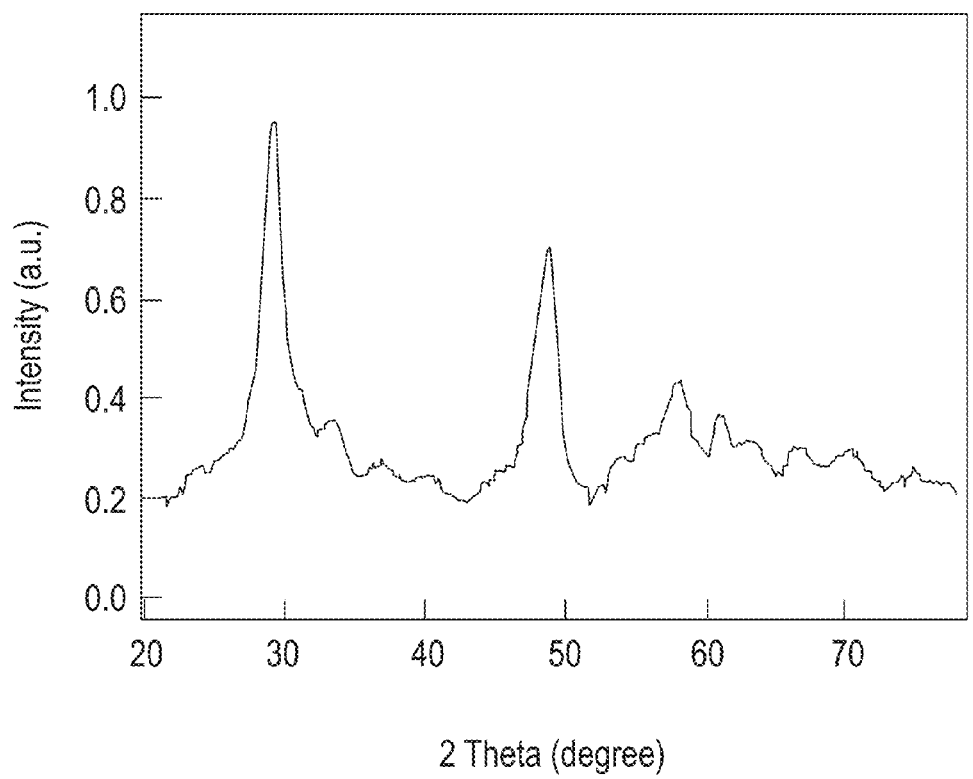
FIG. 2B is a XRD pattern and FIG. 2C is an absorption spectrum of the $CuFeS_2$ chalcopyrite nanoparticles of Example 1.
Figure 2C:
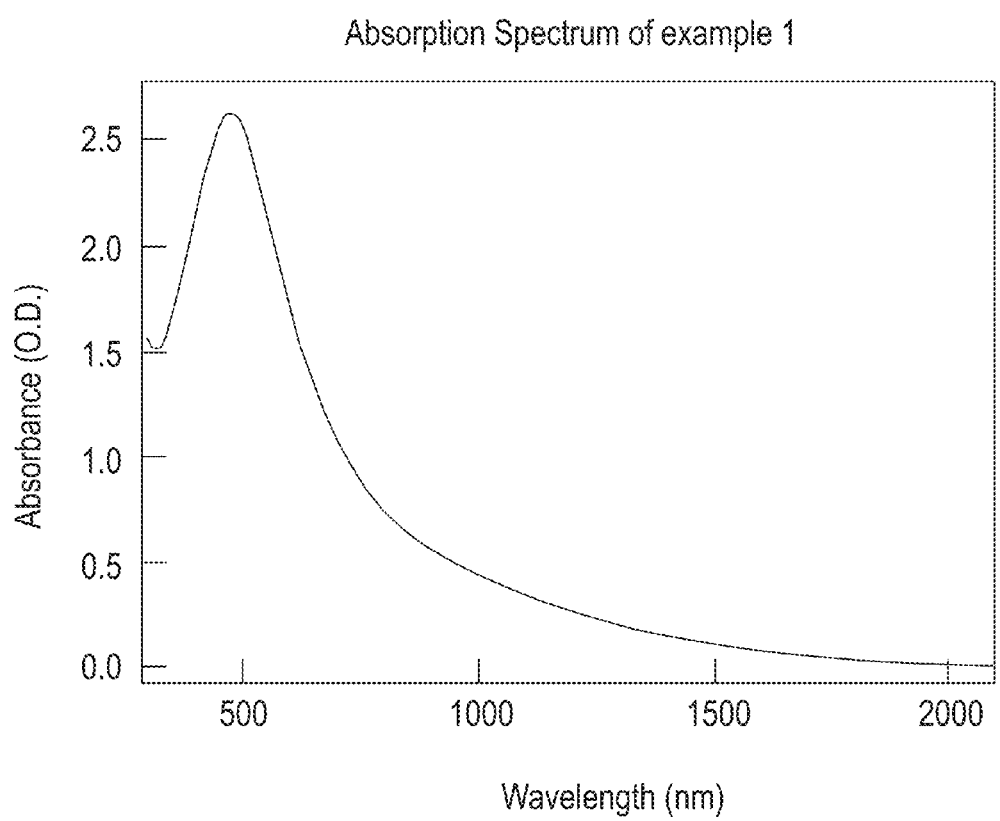

FIG. 2A(a) is a TEM image, FIG. 2A(b) is an HRTEM image, FIG. 2B is a XRD pattern and FIG. 2C is an absorption spectrum of the $CuFeS_2$ chalcopyrite nanoparticles of Example 1. From the TEM of FIG. 2A(a) the size of the as-synthesized $CuFeS_2$ nanoparticles is estimated to be about 5 nm to about 6 nm in diameter with uniform size distribution. Although there are some pyramidal-shaped nanoparticles present, the majority of the $CuFeS_2$ nanoparticles are spherical. The nanoparticles are highly crystalline single crystals as indicated by atomic fringes in the high resolution TEM (HR-TEM) image in FIG. 2A(b). The peaks in the XRD of FIG. 2B indicate the crystal structure of the $CuFeS_2$ nanoparticles is chalcopyrite (JCPDS 37-0471). Importantly, there are no any other impurities in the $CuFeS_2$ nanoparticles. Further verification of the formation of targeted chalcopyrite $CuFeS_2$ nanoparticles is supported by the optical absorption spectrum of $CuFeS_2$ nanoparticles dispersed in tetrachloroethylene, as shown in FIG. 2C. The absorption in the lower energy NIR region is correlated with a charge transfer transition from the valence band to unoccupied Fe (3d) orbitals. The higher energy absorption band in the visible region is attributed to another band-to-band transition.

Example 2

Synthesis of Chalcopyrite $CuFeS_2$ Nanoparticles from Copper (I) Chloride and Iron (III) Acetylacetonate in Dodecylamine and Octadecene In an exemplary synthesis, 1 mmol of copper (I) chloride and 1 mmol of iron (III) acetylacetonate were dissolved in 6 mmol (1.4 mL) of dodecylamine and 10 mL of octadecene in a three-neck flask. The solution was then degassed and dried at 120° C. under vacuum for one hour. The solution was heated to 220° C., whereupon, 2 mL of 1M S-OLMA stock solution diluted with 2 mL of octadecene was rapidly injected. The reaction was continued at 220° C. for one hour, at which point it was terminated by removing the heating element and cooling the solution using air flow. When the temperature reached 60° C., 20 mL of anhydrous toluene was added. The as-synthesized $CuFeS_2$ nanoparticles were purified by the aforementioned purification procedure.

Figure 3A:
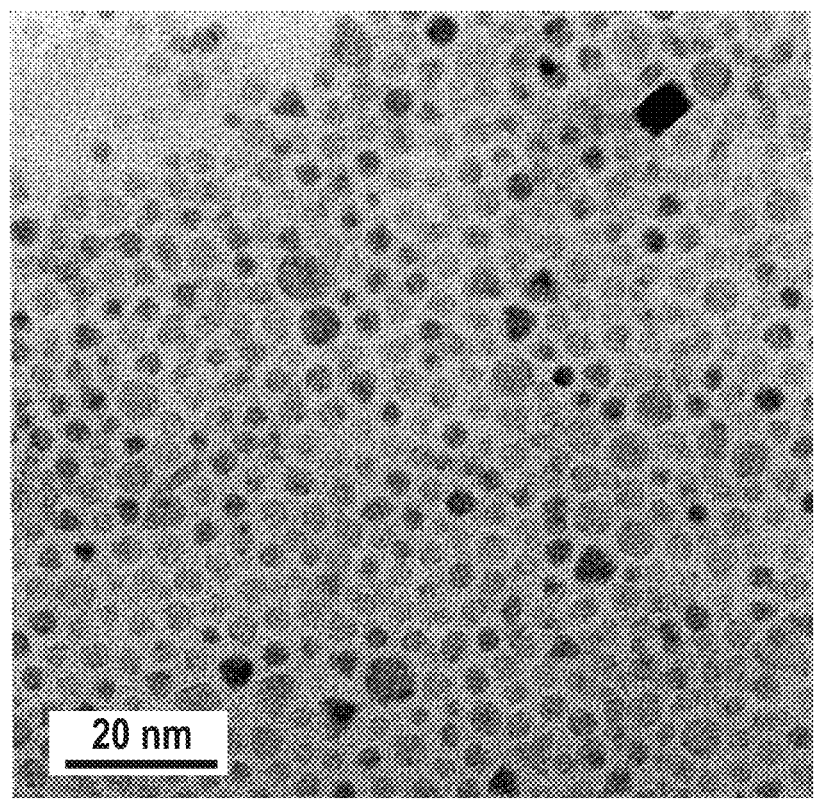
FIG. 3A is a TEM image.
Figure 3B:
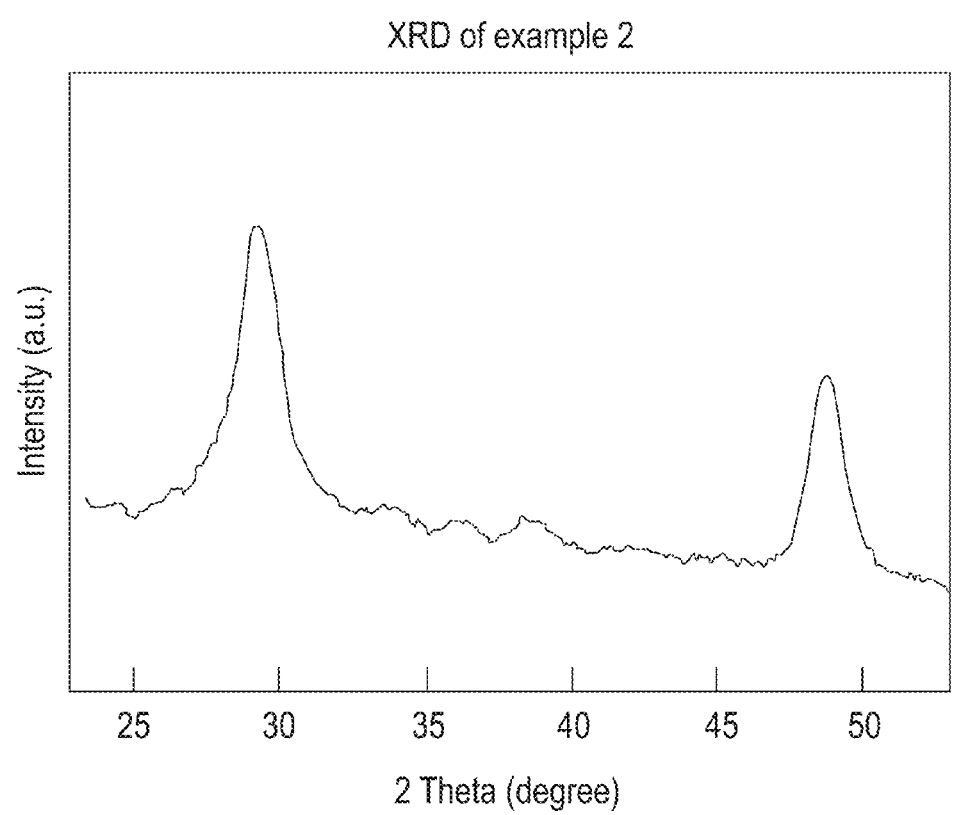
FIG. 3B is a XRD pattern and FIG. 3C is an absorption spectrum of the $CuFeS_2$ chalcopyrite nanoparticles of Example 2.
Figure 3C:
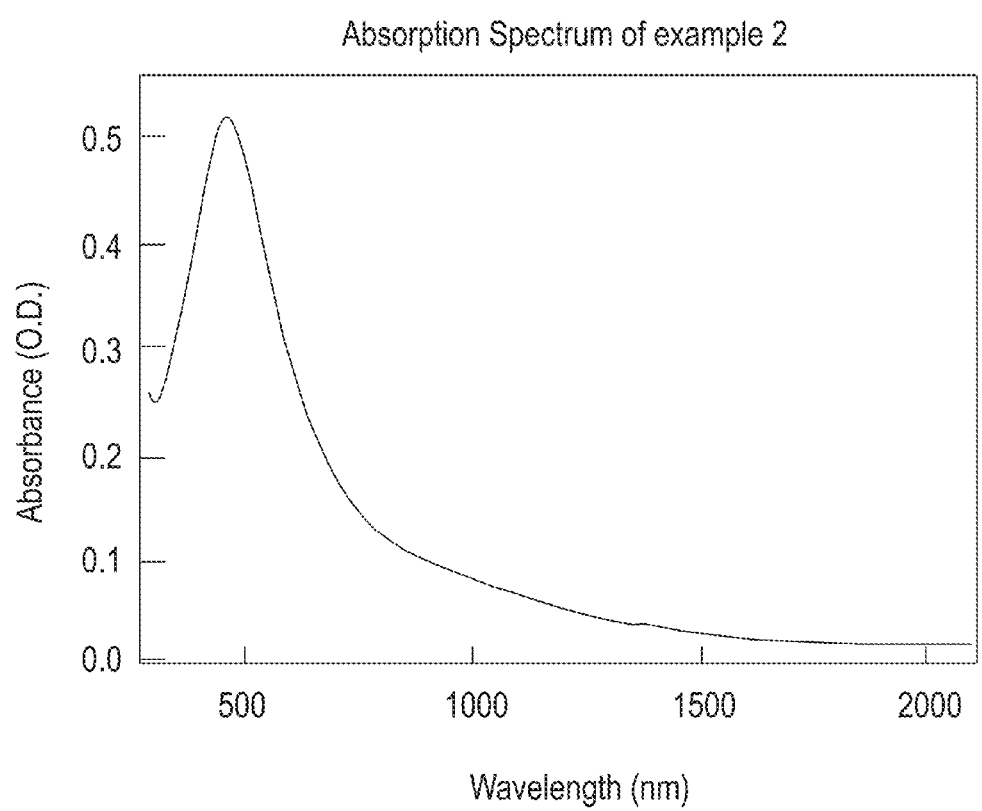

FIG. 3A is a TEM image, FIG. 3B is a XRD pattern and FIG. 3C is an absorption spectrum of the $CuFeS_2$ chalcopyrite nanoparticles of Example 2. Similar to the formation of $CuFeS_2$ in oleylamine conditions, the diameter of most of the spherical $CuFeS_2$ nanoparticles synthesized in dodecylamine and octadecene is increased to about 8 nm to about 10 nm based on FIG. 3A, although some larger shaped nanoparticles are present. The larger size of the nanoparticles is mainly due to the shorter, 16 carbon chain of dodecylamine (compared to the 18 carbon chain of oleylamine in Example 1). The desired crystal structure of chalcopyrite is confirmed again by the XRD of FIG. 3B, which is well matched to the standard chalcopyrite structure (JCPDS 37-0471), and is in a good agreement with Example 1. FIG. 3C is the optical absorption spectrum of $CuFeS_2$ nanoparticles dispersed in tetrachloroethylene. In FIG. 3C there are two absorption bands located in the higher energy visible region and the lower energy NIR (near infrared) region, which is identical to those of the absorption spectrum in Example 1.

Example 3

Synthesis of Zn-Doped Chalcopyrite $CuFeS_2$ Nanoparticles from Copper (II) Acetylacetonate, Iron (III) Acetylacetonate and Zinc (II) Acetylacetonate in Oleylamine and Octadecene In an exemplary reaction for synthesizing $CuFeS_2$ nanoparticles doped with zinc (at a concentration of 10 atomic percent), a solution of a copper-containing compound, an iron-containing compound, and a zinc-containing compound was prepared by mixing 1 mmol copper (II) acetylacetonate, 0.1 mmol zinc (II) acetylacetonate hydrate, and 0.9 mmol iron (III) acetylacetonate in a three-necked reaction flask with 10 mL of octadecene and 6 mL of oleylamine. The solution was degassed and dried using the same procedure as in Examples 1 and 2. The solution of was then heated to 220° C. Then 2 mL of 1M sulfur S-OLMA stock solution was rapidly injected. The reaction was continued at 220° C. for one hour, at which point it was terminated by removing the heating element and cooling the solution using air flow. When the solution temperature reached 60° C., it was quenched by the addition of 20 mL of anhydrous toluene. The as-synthesized Zn-doped $CuFeS_2$ nanoparticles were purified by the above-mentioned purification procedure.

Figure 4A:
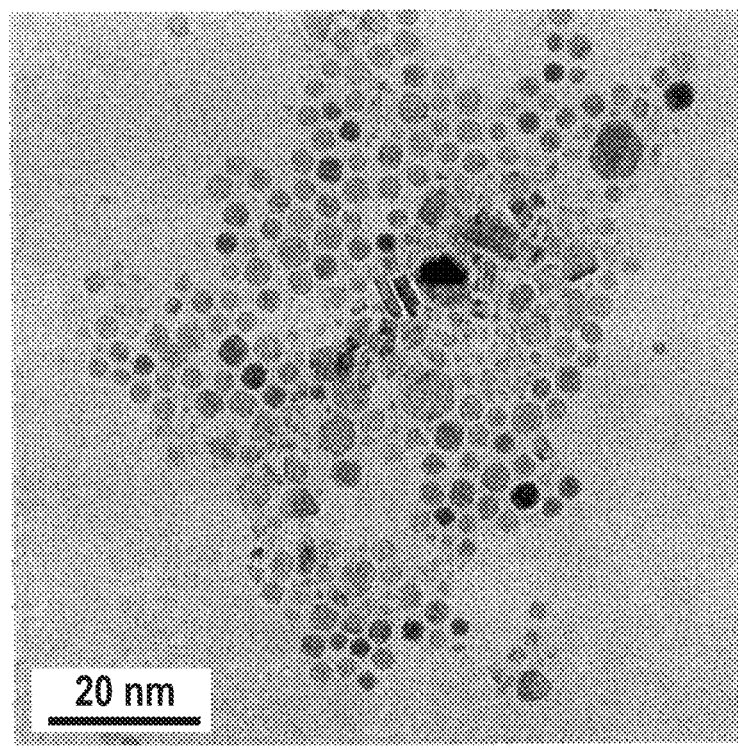
FIG. 4A is a TEM image.
Figure 4B:
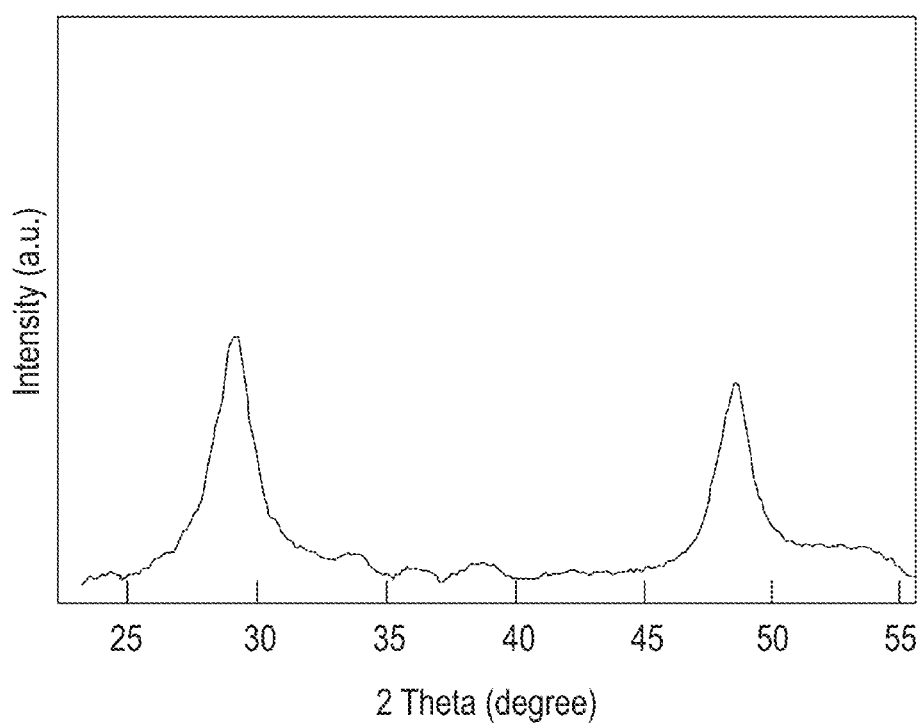
FIG. 4B is a XRD pattern and FIG. 4C is an absorption spectrum of the Zn-doped $CuFeS_2$ chalcopyrite nanoparticles of Example 3.
Figure 4C:
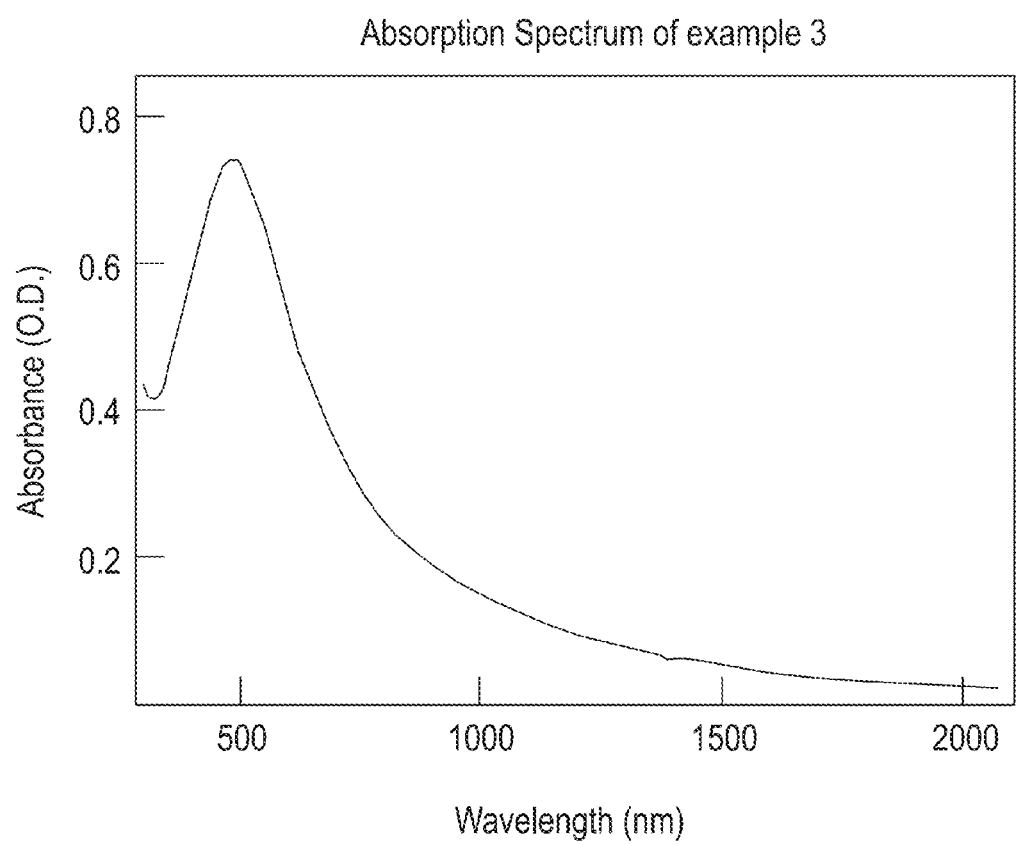

FIG. 4A is a TEM image, FIG. 4B is a XRD pattern and FIG. 4C is an absorption spectrum of the Zn-doped $CuFeS_2$ chalcopyrite nanoparticles of Example 3. Although the atomic percentage of Zn in this specific example is 10%, other samples have been similarly prepared where the Zn-dopant concentration in $CuFeS_2$ was systematically varied from 0 to 100 atomic percent. Further, results indicate that the Zn dopant can be present up to 30 atomic % without the crystal structure deviating from the chalcopyrite phase. The same holds true for impurity materials, as confirmed by the XRD patterns in FIG. 4B. Again, XRD patterns are consistent with the standard XRD patterns (JCPDS 37-0471). Furthermore, from the TEM image as shown in FIG. 4A, it can be clearly seen that the uniform diameter (about 10 nm to about 12 nm) Zn-doped $CuFeS_2$ nanoparticles are formed with a spherical shape. Also, there are some larger sized (about 20 nm) hexagonal-shaped nanoparticles.

When Zn is introduced as a dopant into $CuFeS_2$ nanoparticles, there is no apparent change in the absorption spectrum, as shown in FIG. 4C. There are still two major band to band transitions in the lower energy NIR and the higher energy visible regions, which are identical to those of $CuFeS_2$ nanoparticles, as shown in FIGS. 2C and 3C. Little absorption variation after Zn doping is presumably attributed to the Fe (III) domination effect on the absorption band. Even trace amounts of Fe (III) in wide bandgap $CuGaS_2$ and $CuAlS_2$ generates a low-energy absorption band similar to that of bulk single crystals $CuFeS_2$.

Example 4

The formation of $CuFeS_2$ Thin Films $CuFeS_2$ thin films were formed by spin-casting a suspension of $CuFeS_2$ nanoparticles in a non-polar organic solvent on a one inch diameter Si wafer at ambient atmosphere. In one example, the non-polar organic solvent comprises one or more solvents selected from the group consisting of toluene, hexane, octane, chloroform, tetrachloroethylene, xylene, benzene and 1,2-dichlorobenzene. The wafer was loaded on a spin coater; a few drops of $CuFeS_2$ suspension were then spread on the wafer. After spinning at 500 rpm for 5 seconds and 2000 rpm for 10 minutes, a uniform $CuFeS_2$ film was formed. The as-spun $CuFeS_2$ films were then annealed at a specific temperature for 30 minutes in either argon or nitrogen atmosphere. Alternatively, the annealing atmosphere may include one or more gases selected from the group consisting of $N_2$, He, Ne, Ar, Kr and Xe. The annealing should be performed in an inert (i.e., will not react with $CuFeS_2$) atmosphere. Although spin casting is the only technique demonstrated here, other techniques including, but not limited to, dip-coating, inkjet printing and screen printing can also be utilized for thin film fabrication.

Figure 5:
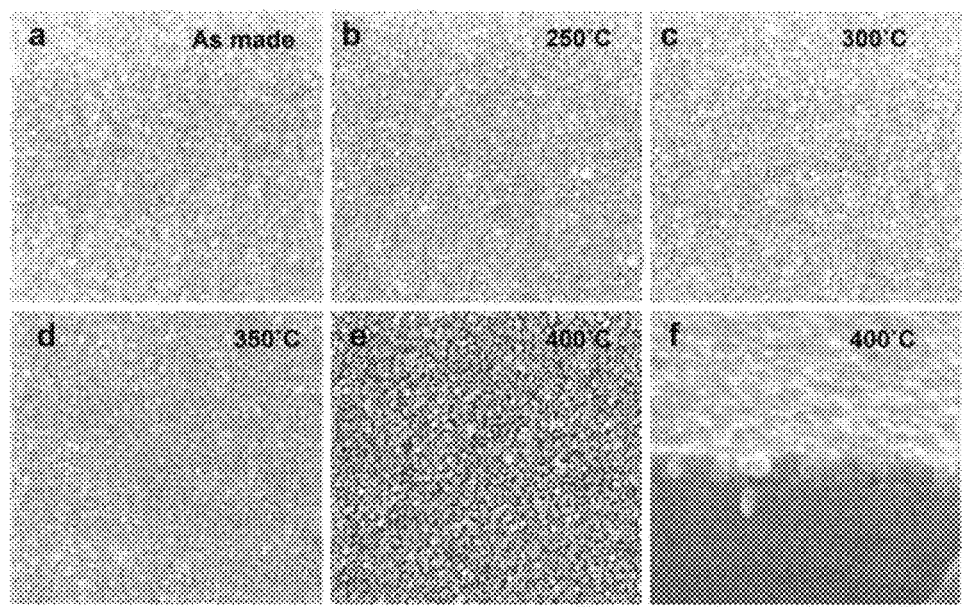
FIG. 5 consists of SEM images of the $CuFeS_2$ chalcopyrite nanoparticle films of Example 4.

FIG. 5 consists of SEM images of the $CuFeS_2$ chalcopyrite nanoparticle films of Example 4. The top-view SEM images (a) through (f) clearly show that the films are smooth and uniform without any apparent cracks. FIG. 5(a) is as made (e.g., as spun). FIGS. 5(b), 5(c), 5(d) and 5(e) are after anneals of 250° C., 300° C., 350° C. and 400° C., respectively. Also, the size of the $CuFeS_2$ nanoparticles increases with increasing annealing temperature. From the cross-section SEM image in FIG. 5(f), which is after a 400° C. anneal, it is estimated that the film thickness is about 50 nm. To increase the thickness of film, one can use either multiple coatings or simply a more concentrated suspension of $CuFeS_2$ nanoparticles.

Figure 6:
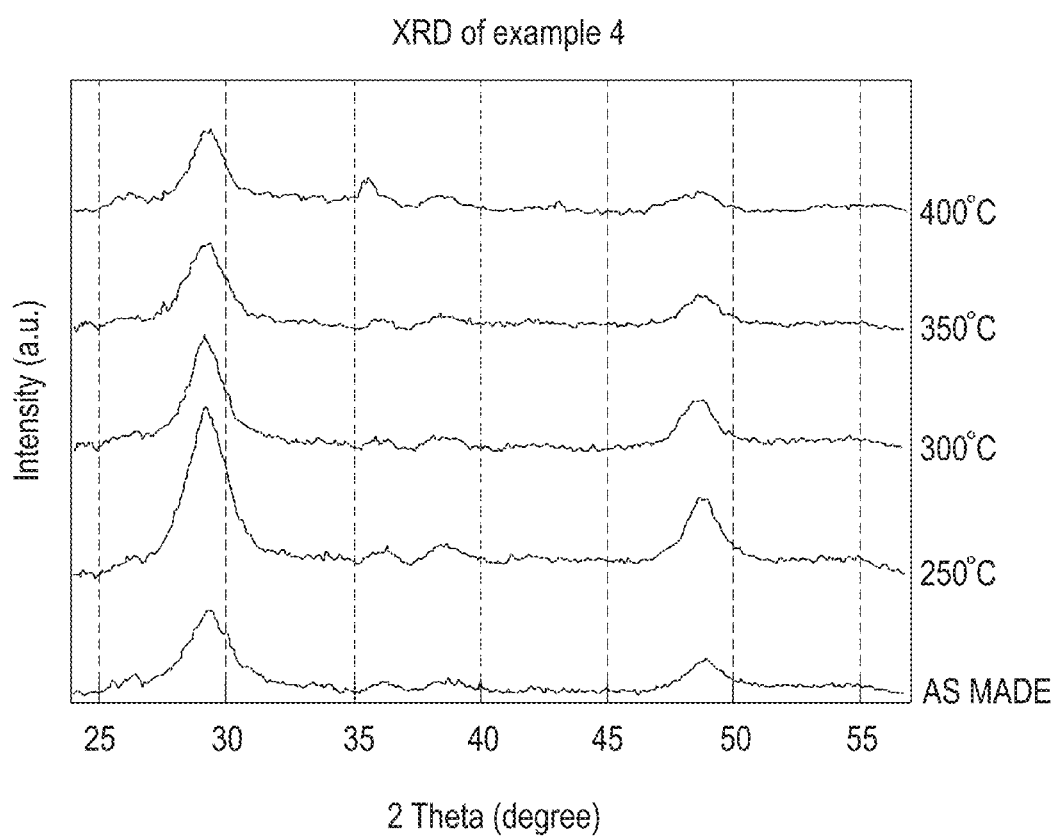
FIG. 6 consists of XRD patterns of the $CuFeS_2$ chalcopyrite nanoparticle films of Example 4.

The effect of annealing temperature on the crystal structure of chalcopyrite is shown in FIG. 6 which consists of XRDs of the $CuFeS_2$ chalcopyrite nanoparticle films of Example 4, as made and after annealing at the indicated temperatures of 250° C., 300° C., 350° C. and 400° C. It can be seen that the chalcopyrite crystal structure is maintained or stable up to 400° C. without any other impurity phase formation, although the peak intensity decreases when the temperature reaches 400° C. This result indicates that, in contrast to prior art chalcopyrite film formation, the $CuFeS_2$ chalcopyrite films of the present invention can be unexpectedly fabricated from $CuFeS_2$ nanoparticles at moderate temperature without introducing any other impurity phase. It is worth noting that at higher temperatures (e.g., greater than 400° C.), sulfur loss could lead to chalcopyrite decomposition, as indicated by the XRD peak intensity reduction at 400° C.

By using the Zn-doped $CuFeS_2$ chalcopyrite nanoparticles of Example 3 in place of the $CuFeS_2$ chalcopyrite nanoparticles used in Example 4, Zn-doped $CuFeS_2$ chalcopyrite films can be made.

In summary, the embodiments of the present invention provides methods of solution-phase synthesis of $CuFeS_2$ chalcopyrite nanoparticles and Zn-doped $CuFeS_2$ nanoparticles using commercially available copper, iron, zinc and sulfur compounds in the presence of an alkyl amine. The size of the $CuFeS_2$ nanoparticles can be controlled by the carbon chain length of alkyl amine. For all of the synthesized $CuFeS_2$ nanoparticles, the desired chalcopyrite structure is formed. For Zn-doped $CuFeS_2$ chalcopyrite nanoparticles, the Zn dopant amount may be increased up to 30 atomic % without any impurity phase being formed. Further, highly toxic precursors are not required and utilize relatively simple processes. The $CuFeS_2$ chalcopyrite nanoparticles and Zn doped $CuFeS_2$ chalcopyrite nanoparticles are of high-purity, have well-defined particle shapes with narrow size distributions. Still further, impurity-free and crack-free thin films can be unexpectedly and easily fabricated by spin-casting a suspension of chalcopyrite $CuFeS_2$ nanoparticles or Zn-doped $CuFeS_2$ chalcopyrite films followed by thermal annealing at moderate temperature (e.g., between about 250° C. and about 400° C.) in an inert atmosphere.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   forming an anhydrous first solution of an iron-containing compound and a copper-containing compound in a first solvent, said first solvent including one or more primary alkyl amines;
   forming a second anhydrous solution of a sulfur-containing compound in a second solvent, said second solvent including one or more alkyl amines;

heating said first solutions to a nucleation temperature;

after said heating, adding said second solution to said first solution to form $CuFeS_2$ chalcopyrite nanoparticles;

maintaining said mixture of said first solution and said second solution at said nucleation temperature for a predetermined length of time;

after said predetermined length of time, cooling said mixture of said first solution and said second solution to a second temperature that is less than said nucleation temperature;

after said mixture reaches said second temperature adding a quenching solvent to said mixture; and purifying said $CuFeS_2$ chalcopyrite nanoparticles.

2. The method of claim 1, wherein said first solvent and said second solvent include an amine independently selected from the group consisting of oleylamine, octadecylamine, hexadecylamine, tetradecylamine, dodecylamine, decylamine and octylamine.

3. The method of claim 1, wherein said first solvent and said second solvent are oleylamine.

4. The method of claim 1, wherein said first solvent and said second solvent are a mixture of dodecylamine and octadecene.

5. The method of claim 1, wherein:
said iron-containing compound includes at least one of iron (III) acetylacetonate, ferric chloride, ferric bromide and ferric iodide; and
said copper-containing compound includes at least one of copper (II) acetylacetonate, cuprous chloride, cuprous bromide and cuprous iodide.

6. The method of claim 1, wherein said copper containing compound is Cu (III) acetylacetonate.

7. The method of claim 1, wherein said copper containing compound is Cu (I) chloride.

8. The method of claim 1, wherein said iron containing compound is Fe (III) acetylacetonate and said copper containing compound is Cu (III) acetylacetonate.

9. The method of claim 1, wherein said iron containing compound is Fe (III) acetylacetonate and said copper containing compound is Cu (I) chloride.

10. The method of claim 1, wherein said second solution includes a non-coordination organic solvent that will not form a coordination complex with copper or with iron.

11. The method of claim 10, wherein said non-coordination organic solvent is a long chain alkene of at least 12 carbon atoms.

12. The method of claim 10, wherein said non-coordination organic solvent is octadecene.

13. The method of claim 1, wherein said nucleation temperature is between 180° C. and 250° C.

14. The method of claim 1, wherein said second temperature is between 50° C. and 90° C.

15. The method of claim 1, wherein said quenching solvent is an anhydrous non-polar organic liquid.

16. The method of claim 15, wherein said quenching solvent includes one or more solvents selected from the group consisting of anhydrous toluene, anhydrous hexane, anhydrous octane, anhydrous chloroform, anhydrous tetrachloroethylene, anhydrous xylene, anhydrous benzene and anhydrous 1,2-dichlorobenze.

17. The method claim 15, wherein said quenching solvent is anhydrous toluene.

18. The method of claim 1, wherein said second solution is rapidly injected into said first solution at a rate of 2 milliliters every 0.3 second or less per 20 milliliters of said first solution.

19. The method of claim 1 wherein said $CuFeS_2$ chalcopyrite nanoparticles have an average particle size between 5 nm and 20 nm in diameter.

20. A method, comprising:
forming an anhydrous first solution of an iron-containing compound, a copper-containing compound and a zinc-containing compound in a first solvent, said first solvent including one or more primary alkyl amines;

forming a second anhydrous solution of a sulfur-containing compound in a second solvent, said second solvent including one or more alkyl amines;

heating said first solutions to a nucleation temperature;

after said heating, adding said second solution to said first solution to form zinc doped $CuFeS_2$ chalcopyrite nanoparticles;

maintaining said mixture of said first solution and said second solution at said nucleation temperature for a predetermined length of time;

after said predetermined length of time, cooling said mixture of said first solution and said second solution to a second temperature that is less than said nucleation temperature;

after said mixture reaches said second temperature adding a quenching solvent to said mixture; and purifying said zinc doped $CuFeS_2$ chalcopyrite nanoparticles.

21. The method of claim 20, wherein:
said iron-containing compound includes at least one of iron (III) acetylacetonate, ferric chloride, ferric bromide and ferric iodide; and
said copper-containing compound includes at least one of copper (II) acetylacetonate, cuprous chloride, cuprous bromide and cuprous iodide.

22. The method of claim 20, wherein said iron containing compound is Fe (III) acetylacetonate, said copper containing compound is Cu (III) acetylacetonate and said zinc-containing compound is Zn (II) acetylacetonate hydrate.

23. The method of claim 20, wherein said first solvent and said second solvent include an amine independently selected from the group consisting of oleylamine, octadecylamine, hexadecylamine, tetradecylamine, dodecylamine, decylamine and octylamine.

24. The method of 20, wherein said first solvent and said second solvent are a mixture of dodecylamine and octadecene.

25. The method of claim 20, wherein said quenching solvent includes one or more solvents selected from the group consisting of anhydrous toluene, anhydrous hexane, anhydrous octane, anhydrous chloroform, anhydrous tetrachloroethylene, anhydrous xylene, anhydrous benzene and anhydrous 1,2-dichlorobenze.

26. The method of claim 20, wherein said second solution is rapidly injected into said first solution at a rate of 2 milliliters every 0.3 second or less per 20 milliliters of said first solution.

27. The method of claim 20, wherein the amount of zinc in said zinc doped $CuFeS_2$ chalcopyrite nanoparticles is 30 atomic percent or less.

* * * * *